United States Patent
Meingast et al.

(10) Patent No.: US 10,479,246 B2
(45) Date of Patent: Nov. 19, 2019

(54) LATTICE BASED SEAT CUSHION TO IMPROVE COMFORT AND VIBRATION ISOLATION

(71) Applicant: Toyota Motor Engineering & Manufacturing North America, Inc., Erlanger, KY (US)

(72) Inventors: Herbert Meingast, Ann Arbor, MI (US); Recep M. Gorguluarslan, Atlanta, GA (US); Umesh Gandhi, Farmington Hills, MI (US); Brian J. Pinkelman, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 175 days.

(21) Appl. No.: 15/581,701

(22) Filed: Apr. 28, 2017

(65) Prior Publication Data
US 2018/0312086 A1  Nov. 1, 2018

(51) Int. Cl.
*B60N 2/70* (2006.01)

(52) U.S. Cl.
CPC ......... *B60N 2/7094* (2013.01); *B60N 2/7017* (2013.01); *F16F 2224/0225* (2013.01); *F16F 2228/063* (2013.01)

(58) Field of Classification Search
CPC .... B60N 2/502; B60N 2/7094; B60N 2/7017; F16F 2224/0225; F16F 2228/063
See application file for complete search history.

(56) References Cited

U.S. PATENT DOCUMENTS

| 4,522,447 A | * | 6/1985 | Snyder | A47C 7/18 297/452.27 |
| 4,898,426 A | * | 2/1990 | Schulz | B64D 11/06 108/901 |

(Continued)

FOREIGN PATENT DOCUMENTS

CN    204774820 U    11/2015

OTHER PUBLICATIONS

Correa, D. et al., "Mechanical Design of Negative Stiffness Honeycomb Materials", Integrating Materials and Manufacturing Innovation, 4:10, pp. 1-11 (2015).

(Continued)

*Primary Examiner* — David R Dunn
*Assistant Examiner* — Tania Abraham
(74) *Attorney, Agent, or Firm* — Christopher G. Darrow; Darrow Mustafa PC

(57) ABSTRACT

Seats in vehicles may include a seat cushion having a seating surface, a vibration isolation structure and a foam structure, with the seating surface configured to support an occupant. The seat cushion may include either a seat bottom or a seat back, with the vibration isolation structure configured to evenly distribute forces exerted by the occupant. The vibration isolation structure may include a plurality of individual lattice blocks. The plurality of individual lattice blocks may occupy a pattern based on a spatial weight distribution of an average-sized occupant or a pattern based on a spatial weight distribution tailored for a specific occupant. The plurality of individual lattice blocks may cooperate to provide the even pressure distribution against forces exerted by the occupant. The vibration isolation structure may isolate vibration in a range from about 0.5 Hz to about 5.0 Hz.

12 Claims, 6 Drawing Sheets

(56) References Cited

U.S. PATENT DOCUMENTS

| | | | | |
|---|---|---|---|---|
| 5,482,351 | A * | 1/1996 | Young | B60N 2/4242 297/216.1 |
| 5,662,376 | A * | 9/1997 | Breuer | B60N 2/4242 296/68.1 |
| 5,747,140 | A * | 5/1998 | Heerklotz | A47C 27/144 248/630 |
| 6,142,563 | A * | 11/2000 | Townsend | B60N 2/4228 297/216.1 |
| 6,896,324 | B1 * | 5/2005 | Kull | B60N 2/4242 297/216.1 |
| 7,100,990 | B2 * | 9/2006 | Kimura | B60N 2/36 297/125 |
| 7,506,937 | B2 * | 3/2009 | Bequet | B60N 2/986 297/452.25 |
| 7,661,764 | B2 * | 2/2010 | Ali | B68G 7/05 297/452.26 |
| 7,717,520 | B2 * | 5/2010 | Boren | B64D 11/06 297/216.1 |
| 7,971,939 | B2 | 7/2011 | Fujita et al. | |
| 8,793,821 | B2 | 8/2014 | Fowkes et al. | |
| 9,731,828 | B2 * | 8/2017 | Lichota | B64D 11/0689 |
| 9,994,136 | B2 * | 6/2018 | Nakada | A47C 27/148 |
| 2004/0145230 | A1 * | 7/2004 | Fujita | A47C 31/006 297/452.27 |
| 2007/0236071 | A1 * | 10/2007 | Fujita | B60N 2/70 297/452.5 |
| 2010/0001568 | A1 | 1/2010 | Trybus et al. | |
| 2015/0130220 | A1 * | 5/2015 | Preisler | B32B 7/12 296/193.07 |
| 2016/0032997 | A1 | 2/2016 | Seepersad et al. | |
| 2017/0158104 | A1 * | 6/2017 | Le | B60N 2/809 |

OTHER PUBLICATIONS

Ferguson-Pell, M., "Seat Cushion Selection", J. Rehab. Res. Dev., Special Supplement #2, 23(3), pp. 49-73 (1986).

* cited by examiner

LATTICE BASED SEAT CUSHION TO IMPROVE COMFORT AND VIBRATION ISOLATION

TECHNICAL FIELD

The present disclosure generally relates to vehicle seats and, more particularly, to vibration isolation structures in vehicle seats.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Modern vehicles commonly have seats to secure an occupant while the vehicle is in motion. More specifically, vehicle seats may provide a surface occupants may sit on in the moving vehicle. For example, vehicle seats commonly include a seat back and a seat bottom, with both the seat back and the seat bottom configured to comfortably contain the occupant in the moving vehicle. While the vehicle seat is well suited to provide comfort for the occupant when the vehicle is in motion, it would be advantageous to provide a vehicle seat that satisfies additional requirements when the vehicle is in motion. For example, the occupant may desire a reduction in vibration that occurs due to the vehicle in motion. Given the space constraints in the vehicle, it would be desirable that a structure to reduce vibration fits within the configuration of a standard vehicle seat.

SUMMARY

This section provides a general summary of the disclosure, and is not a comprehensive disclosure of its full scope or all of its features.

In various aspects, the present teachings provide a seat for a vehicle. The seat includes a seat cushion having a seating surface, a vibration isolation structure, and a foam structure. The seating surface is configured to support an occupant. The vibration isolation structure may include a plurality of individual lattice blocks. The plurality of individual lattice blocks form a two-dimensional lamina. The vibration isolation structure comprises a first surface and opposite second surface. The foam structure may be placed adjacent the first surface of the vibration isolation structure. The seat cushion may be either a seat bottom or a seat back, with the vibration isolation structure configured to evenly distribute forces exerted by the occupant in a generally vertical direction or a generally horizontal direction, respectively. The plurality of individual lattice blocks may occupy a pattern that is based on a spatial weight distribution of an average-sized occupant or a pattern that is based on a spatial weight distribution tailored for a specific occupant. One or more of the plurality of individual lattice blocks may comprise a bi-stable lattice composed of a double concentric beam structure moveable between two stable configurations, with each configuration defining a different shape. Each of the plurality of individual lattice blocks may have a stiffness value based upon a location in the pattern. The plurality of individual lattice blocks cooperate to provide an even pressure distribution against forces exerted by the occupant, with the plurality of the individual lattice blocks having a negative stiffness value. The vibration isolation structure may isolate a vibration in a range from about 0.5 Hz to about 5.0 Hz.

In other aspects, the present teachings provide a seat assembly for a vehicle. The seat assembly includes a seat frame and a seat cushion. The seat cushion includes a seat bottom, a seating surface, and a vibration isolation structure. The seat bottom may be coupled to the seat frame. The seating surface is configured to support an occupant. The vibration isolation structure may include a plurality of individual lattice blocks. The plurality of individual lattice blocks form a two-dimensional lamina. The plurality of individual lattice blocks may occupy a pattern based on a spatial weight distribution of an average occupant such that the plurality of individual lattice blocks cooperate to provide a negative stiffness. One or more of the plurality of individual lattice blocks may comprise a bi-stable lattice composed of a double concentric beam structure moveable between two stable configurations, with each configuration defining a different shape. Each of the plurality of individual lattice blocks may have a stiffness value based upon a location in the pattern such that the plurality of individual lattice blocks cooperate to provide an even pressure distribution against forces exerted by the occupant. The plurality of individual lattice blocks may cooperate to isolate a predetermined vibration of the seat cushion.

In still other aspects, the present teachings provide a method of isolating a predetermined vibration of a seat cushion of a vehicle. The method may include obtaining a spatial weight distribution for an occupant on a seating surface. This may include obtaining the spatial weight distribution for a specific occupant in order to provide a custom seat cushion, or otherwise obtaining an average spatial weight distribution. The method may include creating a pattern correlating the spatial weight distribution with individual lattice blocks having different stiffness values such that forces exerted by the occupant are evenly distributed. The method may also include forming a vibration isolation structure comprising a plurality of individual lattice blocks arranged according to the pattern. This may include forming the vibration isolation structure using individual lattice blocks comprising a bi-stable lattice. The method may further include incorporating the vibration isolation structure in a seat cushion such that the cushion exhibits a negative stiffness to isolate the predetermined vibration. This may further include aligning at least one foam support structure adjacent the vibration isolation structure.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present technology generally provides a seat cushion for a seat in a vehicle. The seat cushion is configured to provide an even pressure distribution against forces exerted by an occupant, which is useful for comfort and support of the occupant. The seat cushion includes a vibration isolation structure defining a plurality of individual lattice blocks. The plurality of individual lattice blocks of the vibration isolation structure occupy a pattern based on a spatial weight distribution of the occupant. Each of the plurality of individual lattice blocks has a stiffness value based upon a location in the pattern, with the plurality of the individual lattice blocks having a negative stiffness value. The unique features of the technology confers superior vibration isolation in a range from about 0.5 Hz to about 5.0 Hz.

Figure 1:
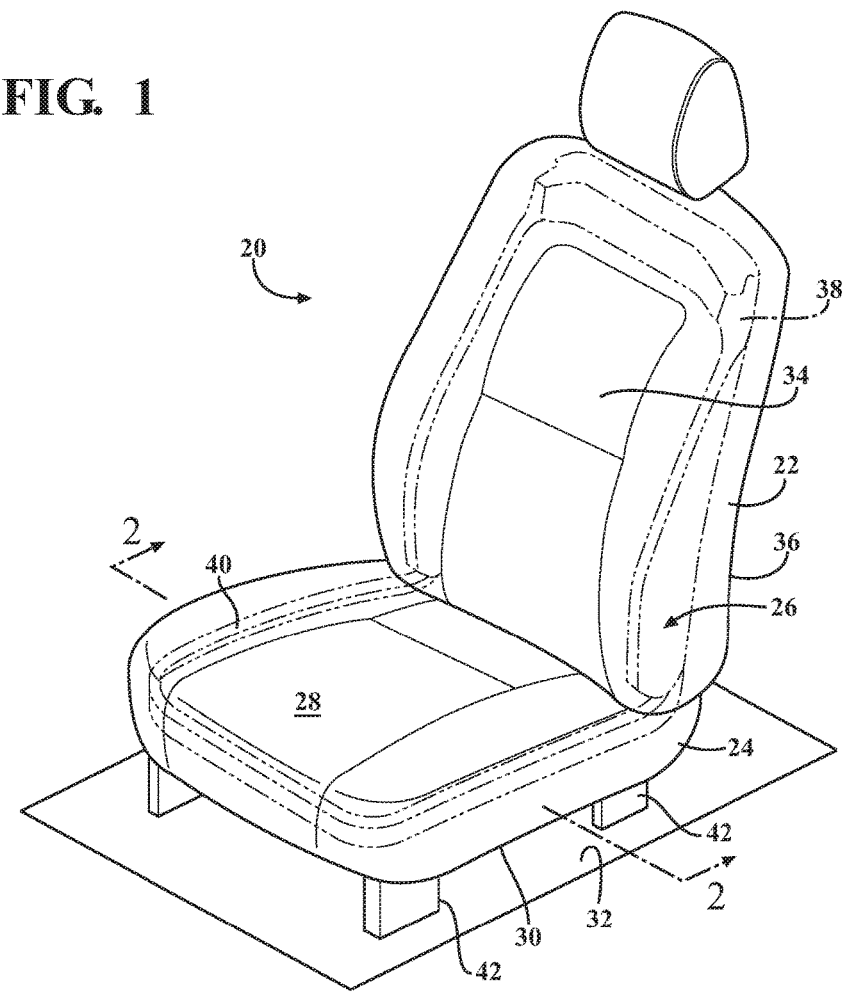
FIG. 1 is a perspective view of a seat assembly comprising a seat frame, a seat bottom, and seat back.

Referring to FIG. 1, an exemplary seat assembly 20 according to various aspects of the present technology may include features to provide comfort and support for the occupant. In one or more arrangements, the seat assembly 20 may include a seat back 22, a seat bottom 24, and a seat frame 26. The seat bottom 24 may include a seating surface 28 for engaging a lower torso or lower extremities of the occupant. A lower surface 30 of the seat bottom 24 may be opposite the seating surface 28, with the lower surface 30 proximate a floor 32 of the vehicle. The seat back 22 may include a cushioned surface 34 for engaging an upper torso or back side of the occupant. A rear surface 36 of the seat back 22 may be located opposite the cushioned surface 32, facing generally toward a rear of the vehicle. The seat back 22 and seat bottom 24 may be operatively coupled to the vehicle via the seat frame 26. The seat frame 26 may include an upper frame portion 38 configured to support the force exerted on the seat back 22, and a lower frame portion 40 configured to support the force exerted on the seat bottom 24. The lower frame portion 40 may include a plurality of legs 42 connecting the lower frame portion 40 of the seat frame 26 to the floor 32 of the vehicle.

While arrangements will be described herein with respect to automobiles, it should be understood that embodiments are not limited to automobiles. A vehicle may be a watercraft, an aircraft, a train, a space craft, or any other vehicle for transport. Additionally, while arrangements will be described with respect to seat assemblies in vehicles, it should be understood that embodiments are not limited to seat assemblies in vehicles. Seat assemblies may be an office chair, a desk chair, a massage chair, or any other chair that provides comfort and support to the occupant.

Figure 2:
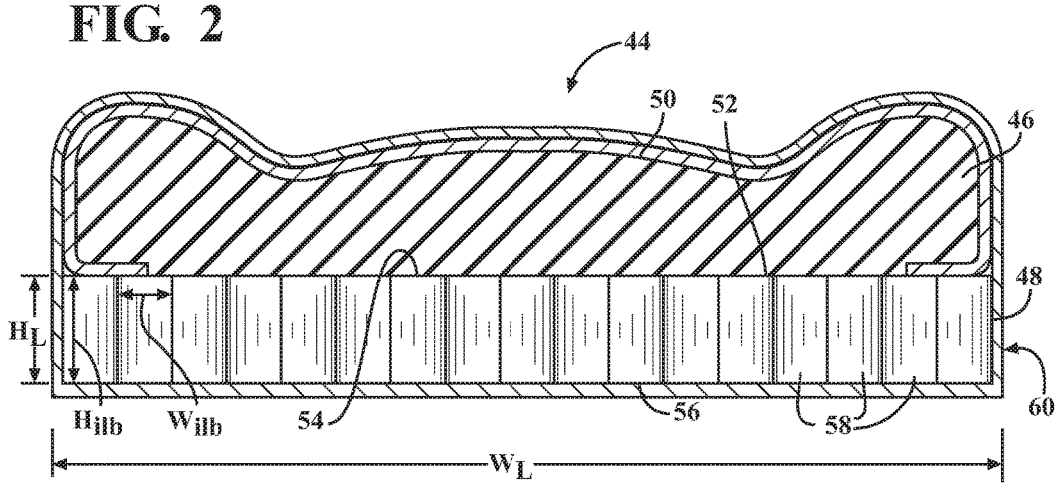
FIG. 2 is a cross-sectional view of a seat bottom cushion taken along the line 2-2 of FIG. 1, illustrating a vibration isolation structure and a foam structure according to the present technology.

In one or more arrangements, the seat assembly 20 may include a seat cushion 44. FIG. 2 is a cross-sectional view of a seat bottom cushion 44 taken along the line 2-2 of FIG. 1, illustrating a vibration isolation structure and a foam structure according to the present technology. The seat cushion 44, such as that shown in FIG. 2, may provide comfort and support as a component of the seat back 22, the seat bottom 24, or both. The seat cushion 44 may include a foam structure 46 and a vibration isolation structure 48. The foam structure 46 may include a first surface 50 and a second surface 52, with the first surface 50 configured to be engaged by the occupant, and the second surface 52 located proximate the vibration isolation structure 48, opposite the first surface 50. The foam structure 46 may be a single piece structure or composed of a plurality of pieces. The foam structure 46 may be composed of any material, such as foam, that facilitates a comfortable engagement by occupant on the seat cushion 44. While arrangements will be described herein with respect to the seat cushion 44 in the seat bottom 24 and the seat back 22, it should be understood that embodiments are not limited to seat cushions in seat bottoms and seat backs. The seat cushion may be in a leg rest, arm rest, head rest, or any other device that provides comfort and support as a component of seat assembly.

In one or more arrangements, the vibration isolation structure 48 may include a first surface 54 and a second surface 56, with the first surface 54 of the vibration isolation structure 48 configured to engage the second surface 52 of the foam structure 46. Additionally, the first surface 54 of the vibration isolation structure 48 is opposite the second surface 56. The vibration isolation structure 48 may be composed of a plurality of individual lattice blocks 58. As shown, the plurality of individual lattice blocks 58 form a two-dimensional lamina 60. More specifically, the plurality of individual lattice blocks 58 may form a single layer structure, which is referred to herein as a two-dimensional lamina 60, with a height $H_L$ of the two-dimensional lamina 60 defined by a height $h_{ilb}$ of the plurality of individual lattice blocks 58, and a width $W_L$ of the two-dimensional lamina 60 defined by a width of the vibration isolation structure 48. The width $W_L$ of the two-dimensional lamina 60 is a summation of widths $w_{ilb}$ of each of the plurality of individual lattice blocks 58. The dimensions of each of the plurality of individual lattice blocks are defined by height $h_{ilb}$ and width $w_{ilb}$.

Figure 3A:
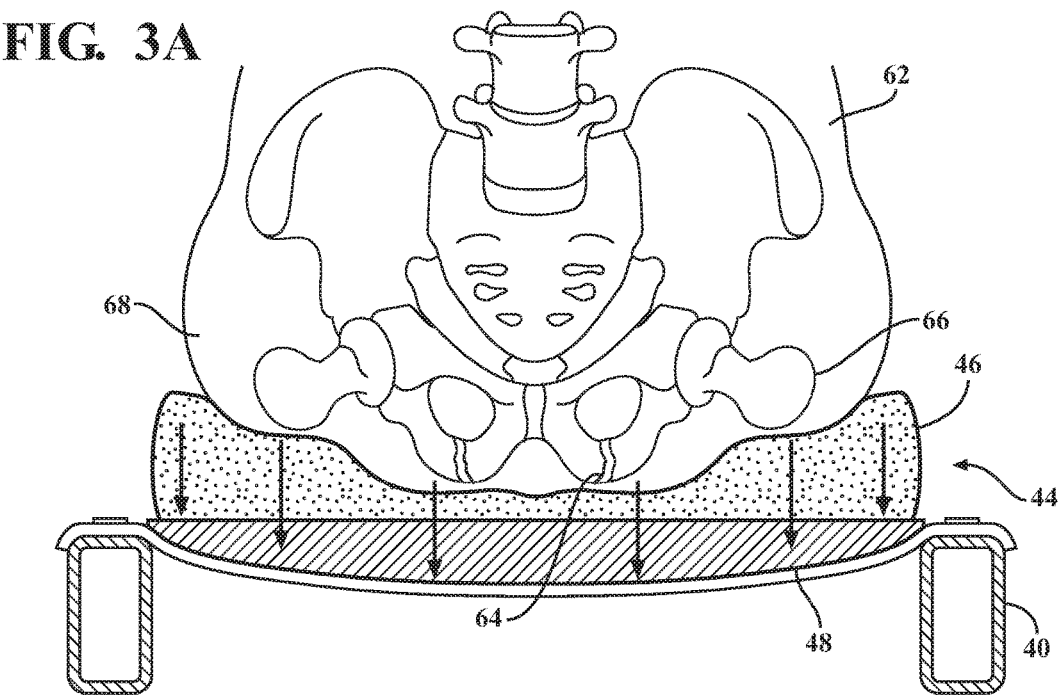
FIG. 3A is a cross-sectional view of an occupant exerting vertical forces on a seating surface of a seat cushion according to the present technology.
Figure 3B:
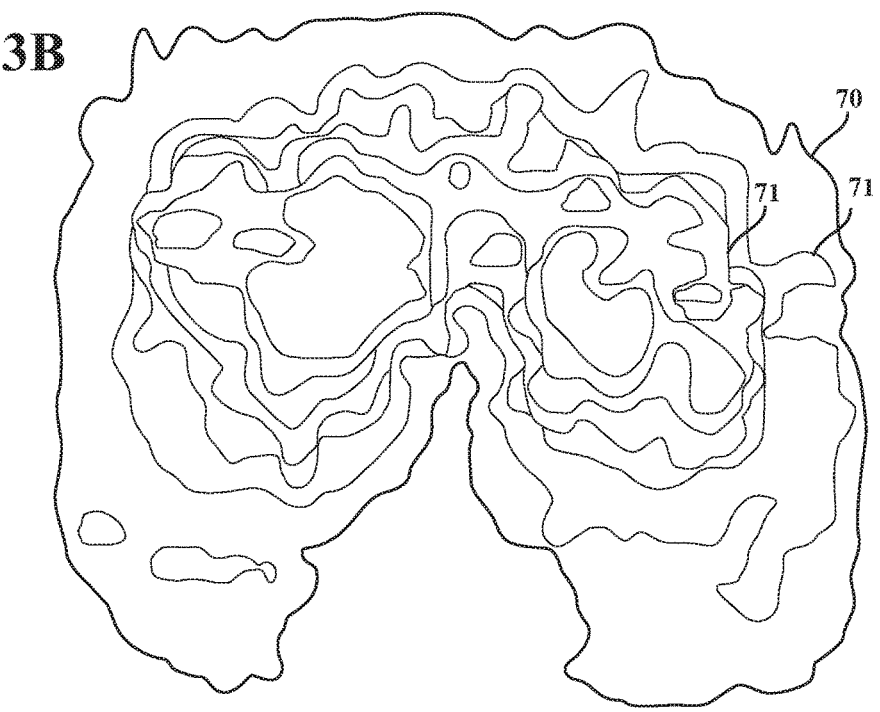
FIG. 3B is a two-dimensional view of an exemplary spatial weight distribution of the occupant of FIG. 3A on the seating surface of the seat cushion.

The seat cushion 44 may be engaged by an occupant in the vehicle. While the seat cushion 44 may be a component of the seat back 22 or the seat bottom 24, for exemplary purposes only, arrangements will be described herein with respect to seat cushion 44 as a component of seat bottom 24. FIG. 3A is a cross-sectional view showing an occupant exerting vertical forces on a seating surface 28 of a seat cushion 44 according to the present technology. FIG. 3B is a two-dimensional view of an exemplary spatial weight distribution of the occupant of FIG. 3A on the seating surface 28 of the seat cushion 44. As shown in FIG. 3A, the seat cushion 44 is engageable by occupant, such as a seated occupant 62. The seated occupant 62 exerts force on the seat cushion 44 as indicated by the directional arrows. The force exerted by the seated occupant 62 on seat cushion 44 varies according to location on the seat cushion 44. For the seat cushion 44 as a component of the seat bottom 24, the force exerted by the seated occupant 62 is greatest inferior and proximate the ischial tuberosity 64. The force is diminished inferior and proximate the greater trochanter of femur 66, and is even more diminished inferior and proximate an outer thigh region 68. The spatial variation in the force exerted by the seated occupant 62 results in an uneven distribution of forces across the seat cushion 44. This uneven distribution of forces may diminish comfort experienced by the seated occupant 62. For the seat bottom 24, this uneven distribution of force is in a generally vertical direction. For the seat back 22, the uneven distribution of force is in a generally horizontal direction.

As shown in FIG. 3B, the force exerted by the seated occupant 62 results in a spatial weight distribution profile 70 having a plurality of boundary lines 71 indicating different force levels. The spatial weight distribution profile 70, in one or more arrangements, illustrates the uneven distribution of forces on the seat cushion 44. The spatial weight distribution profile 70 may be reflective of forces exerted by the seated occupant 62 as the occupant engages the seat cushion 44. The spatial weight distribution profile 70 may vary as a function of a size, weight, and anatomical structure of the occupant. As an example, occupants with a smaller size and smaller build may display a different spatial weight distribution profile 70 than occupants with a larger size and larger build.

Figure 4A:
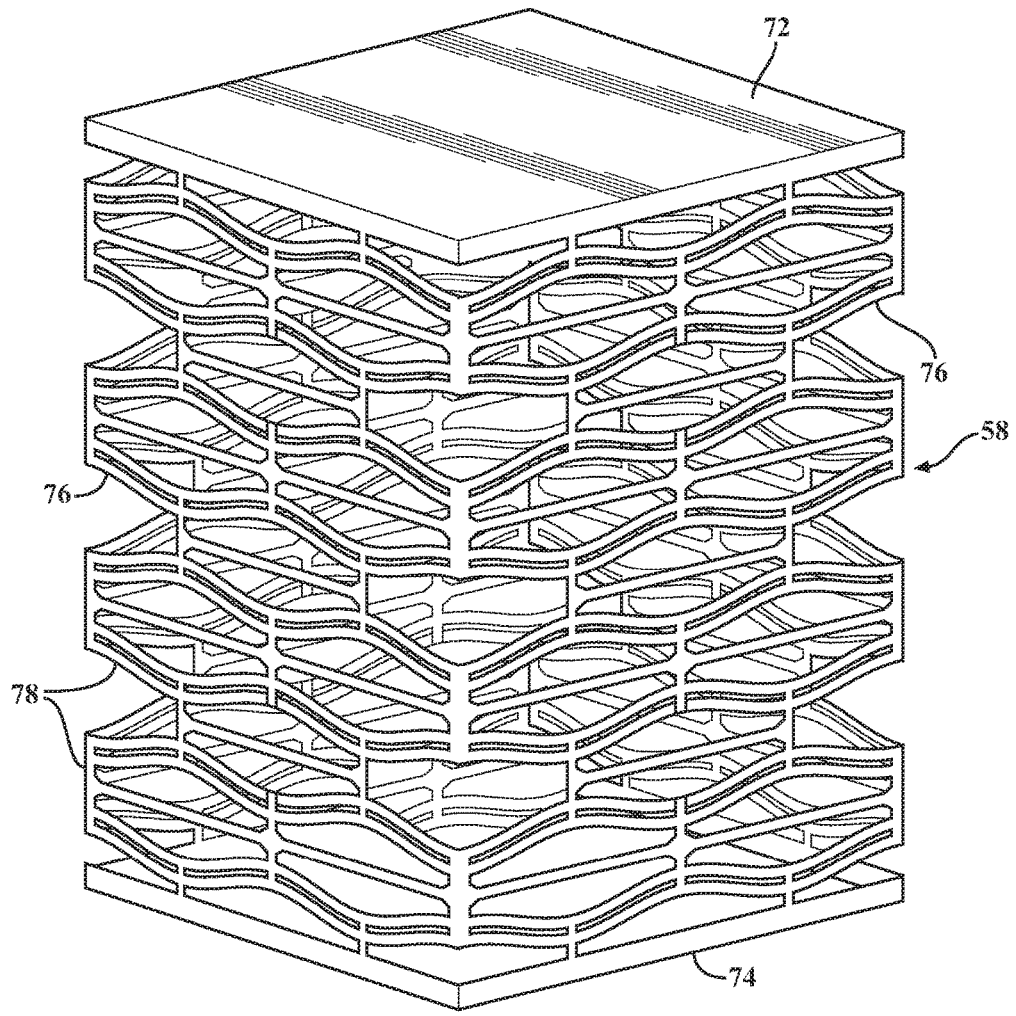
FIG. 4A is a perspective view of an individual bi-stable lattice block in the vibration isolation structure according to a first embodiment.

FIG. 4A is a perspective view of an individual lattice block in the vibration isolation structure according to a first embodiment. The lattice block may be a bi-stable lattice block, as will be detailed below. In one or more arrangements, as shown in FIG. 4A, each individual lattice block 58 may include a first surface 72 and a second surface 74, with the second surface 74 located opposite the first surface 72. Further, each individual lattice block 58 may include a plurality of faces 76, with each face 76 having a geometrical arrangement generally similar to each of the other faces 76. The center area of the block 58 may be hollow. While arrangements will be described herein with respect to each individual lattice block 58 having four faces 76, it should be understood that embodiments are not limited to each individual lattice block 58 having four faces. Each individual lattice block 58 may have three, or five, or six, or seven or more faces. The geometrical arrangement of each face 76 of each individual lattice block 58 may provide for a high degree of energy absorption, such that each individual lattice block 58 may withstand repeated cycles of loading and unloading.

Figure 4B:
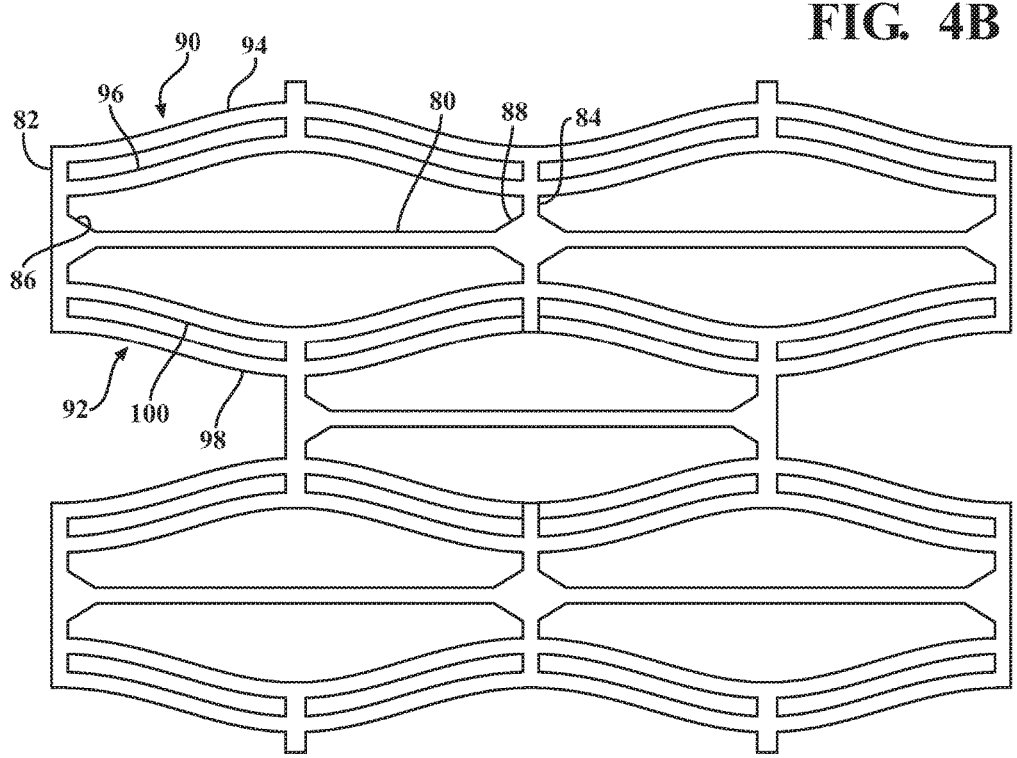
FIG. 4B is a front view of the individual bi-stable lattice block of FIG. 4A.
Figure 4C:
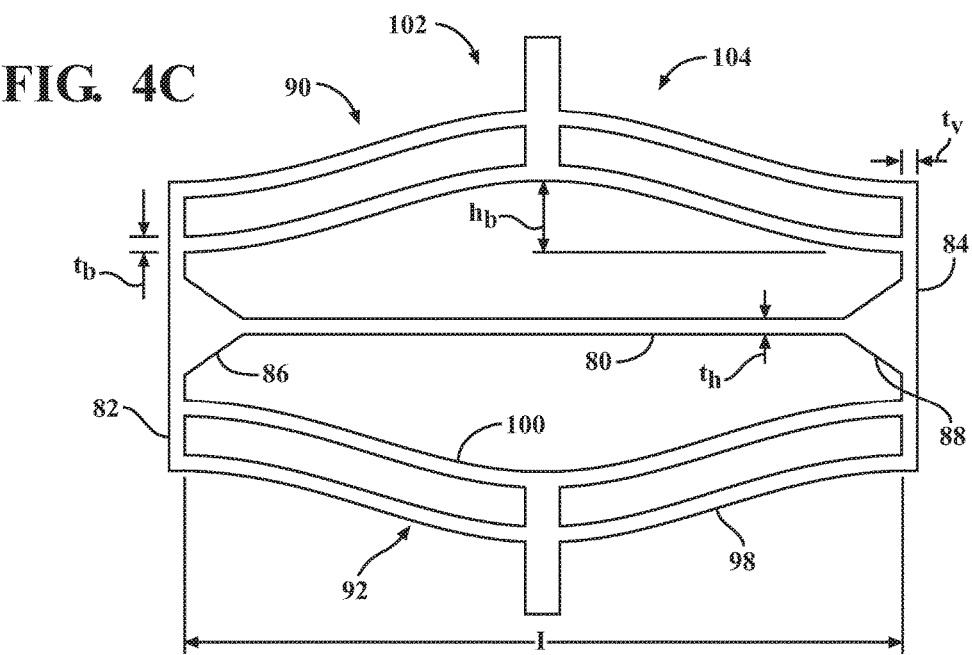
FIG. 4C is a front view of the individual bi-stable lattice block in the vibration isolation structure of FIG. 4A in an unloaded configuration.
Figure 4D:
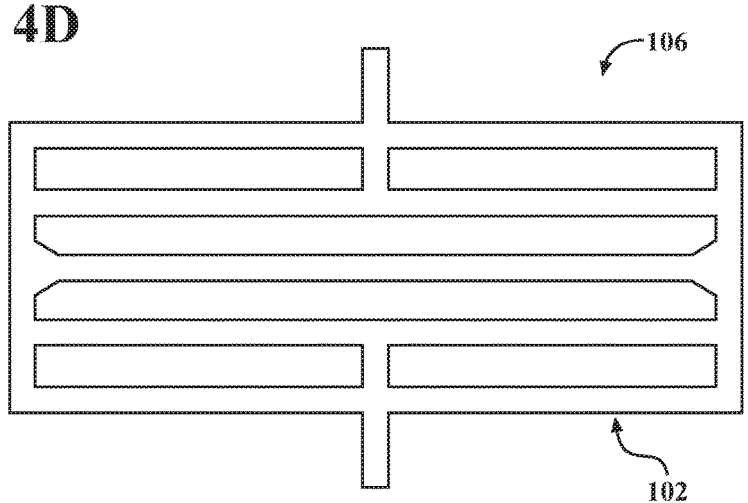
FIG. 4D is a front view of the individual bi-stable lattice block in the vibration isolation structure of FIG. 4A in a loaded configuration.

FIG. 4B is a front view of the individual bi-stable lattice block of FIG. 4A. FIG. 4C is a front view of the individual bi-stable lattice block in the vibration isolation structure of FIG. 4A in an unloaded configuration, while FIG. 4D is a front view of the individual bi-stable lattice block in the vibration isolation structure of FIG. 4A in a loaded configuration. In one or more arrangements, as shown in FIGS. 4B and 4C, each individual lattice block 58 may comprise a plurality of micro-structures 78. Each of the plurality of micro-structures 78 may include a horizontal wall 80, a first vertical wall 82, and a second vertical wall 84. The first vertical wall 82 is opposite the second vertical wall 84, with the horizontal wall 80 connecting therebetween the first vertical wall 82 and the second vertical wall 84. A first chamfer 86 provides support at a junction between the first vertical wall 82 and the horizontal wall 80, while a second chamfer 88 provides support at a junction between the second vertical wall 84 and the horizontal wall 80. A first double concentric beam 90 connects therebetween the first vertical wall 82 and the second vertical wall 84 superior to the horizontal wall 80, while a second double concentric beam 92 connects therebetween the first vertical wall 82 and the second vertical wall 84 inferior to the horizontal wall 80. The first double concentric beam 90 is comprised of a first beam 94 and a second beam 96, while the second double concentric beam 92 is comprised of a first beam 98 and a second beam 100.

In one or more arrangements, the micro-structure 78, including the horizontal wall 80, first and second vertical walls 82, 84 and the first and second double concentric beams 90, 92 defines a bi-stable lattice 102. The bi-stable lattice 102 is stable in both an unload configuration 104, as shown in FIG. 4C, and a loaded configuration 106, as shown in FIG. 4D. The bi-stable lattice 102 is moveable between at least the unloaded configuration 104 and the loaded configuration 106, with each configuration defining a different shape. In the unloaded configuration 104, the bi-stable lattice 102 is not exposed to a load, such as a condition when there is no force exerted by the occupant. In the loaded configuration 106, the bi-stable lattice 102 is exposed to a load, such as a condition when there is force exerted by the seated occupant 62. The first and second double concentric beams 90, 92 have a height $h_b$, in the unloaded configuration 104. The first and second double concentric beams 90, 92 have a height less than $h_b$ in the loaded configuration 106. The range of heights for the first and second double concentric beams 90, 92 in the loaded configuration 106 is between $h_b$ and 0.

In one or more arrangements, each individual bi-stable lattice 102 possesses a stiffness value. The stiffness value of each individual bi-stable lattice 102 is a result of a shape of the bi-stable lattice 102, and parameters of the bi-stable lattice 102, including but not limited to a thickness $t_b$ of the first beam 94, 98, and second beam 96, 100, a thickness to of the horizontal wall 80, a thickness $t_v$ of the vertical walls 82, 84, a length l of the bi-stable lattice 102, and the height $h_b$ of the first and second double concentric beams 90, 92, as shown in FIG. 4C. The stiffness value for each individual bi-stable lattice 102 may be a positive value or a negative value. A positive stiffness value is defined as when force is applied to an object (such as the bi-stable lattice 102), a displacement is observed in same direction as the force applied. Objects having positive stiffness value push back and oppose force applied to the object. A negative stiffness is defined as when force is applied to the object, the displacement is observed in an opposite direction as the force applied. Objects having negative stiffness value display vibrational and acoustical absorbance properties because the objects assist rather than resist deformation as a result of the force applied. An overall stiffness values for the plurality of bi-stable lattices 102 may be a positive or negative value. In one or more arrangements, the plurality of bi-stable lattices 102 may display an overall negative stiffness value, thereby facilitating vibrational energy and acoustical noise absorbance of the seat cushion 44 in the vehicle. The vibration isolation structure 48 having overall negative stiffness value enhances comfort experienced by the seated occupant 62 by reduction in vibrational energy and acoustical noise experienced during operation of the vehicle.

Figure 4E:
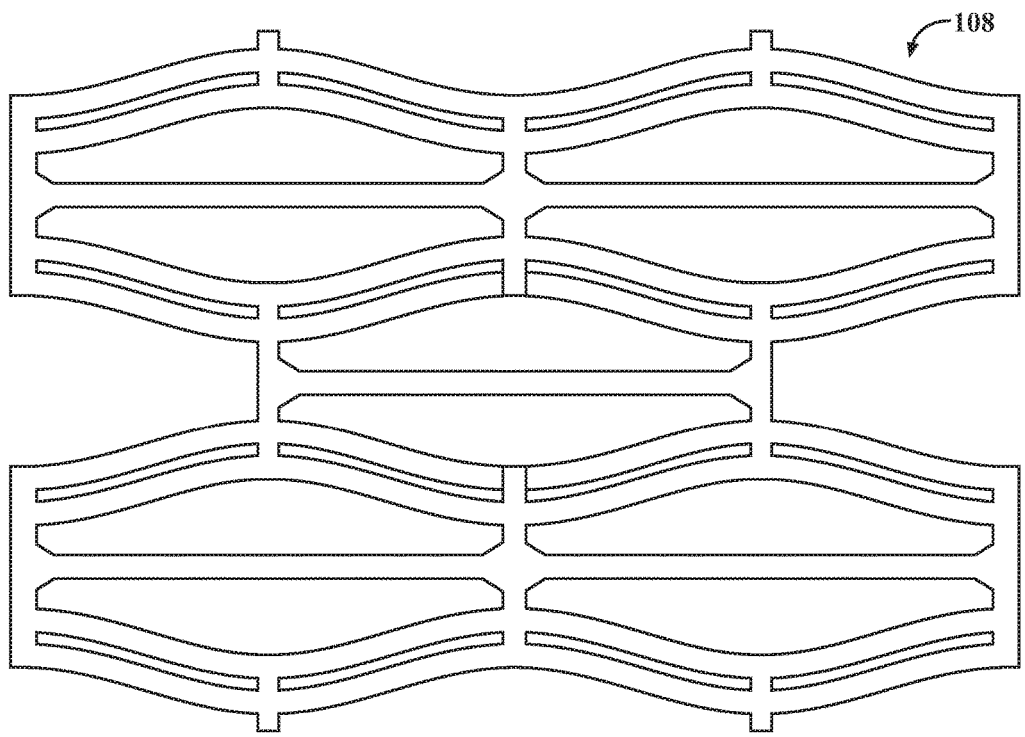
FIG. 4E is a front view of an individual bi-stable lattice block in the vibration isolation structure according to a second embodiment.

In one or more arrangements, each of the plurality of bi-stable lattices 102 may possess unique stiffness values $S_1$-$S_N$. FIG. 4E is a front view of an individual bi-stable lattice block 108 in the vibration isolation structure according to a second embodiment. For exemplary purposes only, as shown in FIG. 4E, the individual bi-stable lattice 108 may possess an increased thickness $t_b$ of the first beam 94, 98 and second beam 96, 100; increased thickness to of the horizontal wall 80; and increased thickness $t_v$ of the vertical walls 82, 84. Additionally, the bi-stable lattice 108 may possess decreased height $h_b$ of the first and second double concentric beams 90, 92. Alterations exemplified in the bi-stable lattice 108 of FIG. 4E may increase a stress threshold, initial stiffness, and energy absorbance in comparison to the bi-stable lattice 102 of FIG. 4C. The parameters of the bi-stable lattice 108 in FIG. 4E may be altered without affecting an overall size of the bi-stable lattice 108, or the shape of the bi-stable lattice 108. Alternatively, alterations to the bi-stable lattice may include changes to the overall size of the bi-stable lattice and changes in the shape of the bi-stable lattice.

Vehicles, when in operation, may produce vibrational energy. The vibrational energy may be transferred to the occupant in the vehicle via the seat assembly 20. More specifically, when the seated occupant 62 is engaged with the seat assembly 20, the vibrational energy produced by the operation of the vehicle may be transferred to the seat occupant 62 via the seat back 22 and seat bottom 24. Vehicle seats may exhibit vibrational energy in a range of from about 0.5 Hz up to about 50 Hz, or even up to about 60 Hz. In particular, vibrational energy in a range of from about 0.5 Hz to about 5.0 Hz includes the resonance of the human body, and may be transferred to the seated occupant 62 while engaged in the seated assembly 20 of the operating vehicle, which may cause localized discomfort to the occupant 62. In one or more arrangements, the vibration isolation structure 48 of the seat cushion 44 of the present technology is configured to isolate vibrational energy in a range from about 0.5 Hz to about 5.0 Hz. More specifically, the plurality of bi-stable lattices 102 comprising the vibration isolation structure 48 exhibit overall negative stiffness value, with the overall negative stiffness value configured to enhance the vibrational energy absorbance of the seat cushion 44 in the range of about 0.5 Hz to about 5.0 Hz. In various aspects, the vibration isolation structure isolates a predetermined vibration that, in certain non-limiting embodiments may be about 2.5 Hz. In various other aspects, the vibration isolation structure can be configured to isolate a predetermined vibration much greater, for example, closer to the upper end of up to about 40 Hz, up to about 50 Hz, or up to about 60 Hz.

As shown in FIG. 3A, the seat cushion 44 is engageable by the seated occupant 62. The seated occupant 62 typically exerts an unequal distribution of force on the seat cushion 44 resulting from the unequal distribution of mass on a posterior surface of the seated occupant 62. The unequal distribution of force on the seat cushion 44 decreases comfort experienced by the seated occupant 62. As an example, two or more, and in certain embodiments, each, of the plurality of individual lattice blocks 58 may be configured to possess unique stiffness values $S_1$-$S_N$. Further, the plurality of individual lattice blocks 58 may be arranged into a pattern. The precise pattern of the plurality of individual lattice blocks 58 may be based upon the forces exerted on the seat cushion 44.

Figure 5:
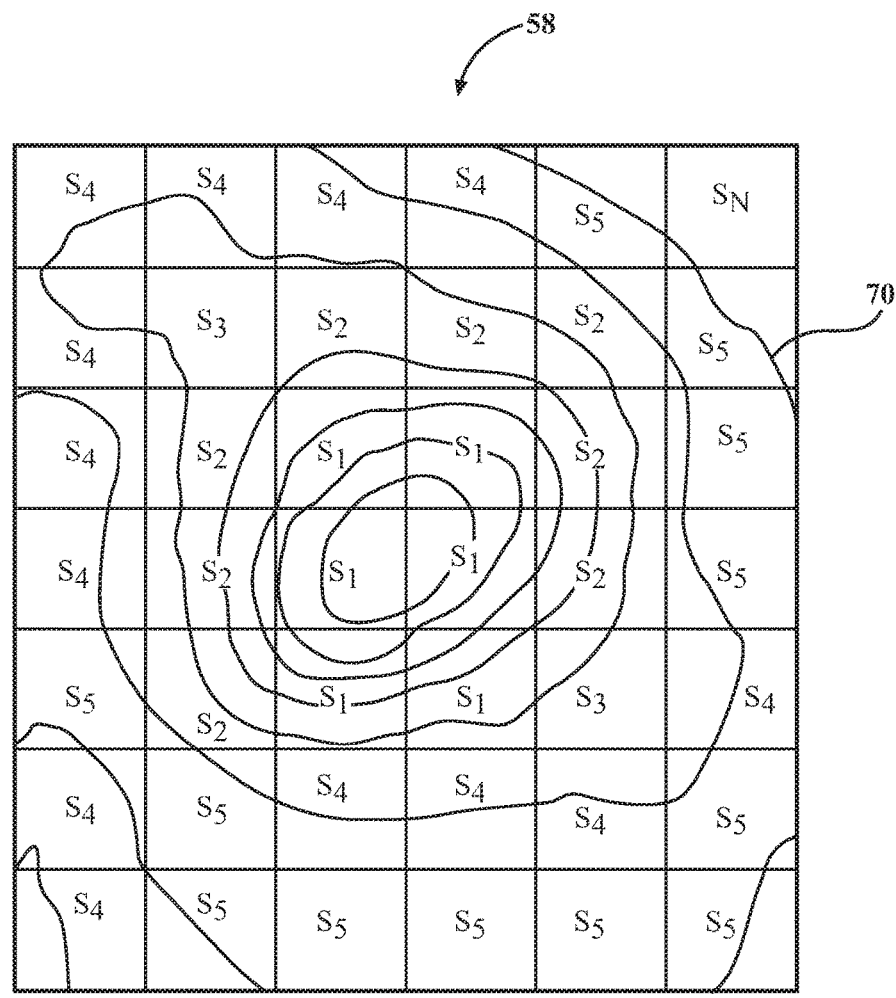
FIG. 5 illustrates a plurality of individual bi-stable lattice blocks having various stiffness values arranged occupying a pattern in the seat cushion to counteract forces exerted by the occupant.

FIG. 5 illustrates a plurality of individual bi-stable lattice blocks 58 having various stiffness values arranged occupying a pattern in the seat cushion to counteract forces exerted by the occupant. For example, FIG. 5 can be considered a magnified view of a portion of the two-dimensional spatial weight distribution as shown in FIG. 3B. As shown in FIG. 5, in one or more arrangements, the pattern of the plurality of individual lattice blocks 58 having unique stiffness values $S_1$-$S_N$ may be based upon the unequal force distribution exerted by the seated occupant 62. In such a way, the distribution of the plurality of individual lattice blocks 58 may cooperate to facilitate a substantially even force distribution across the seat cushion 44. The comfort of the seated occupant 62 is typically enhanced when there is more of an even force distribution across the seat cushion 44.

In one or more arrangements, the spatial weight distribution profile 70 reflects force exerted on the seat cushion 44 by the seated occupant 62. The range of occupants (with regard to size and weight) that may engage the seat assembly 20 in the vehicle is broad. Approximations may be created, allowing for the delineation of spatial weight distribution profile 70 of an average-sized occupant. In the vibrational isolation structure 48 of the seat cushion 44, the plurality of individual lattice blocks 58 may be arranged as to facilitate the even force distribution across the seat cushion 44. More specifically, the arrangement of the plurality of individual lattice blocks 58 having unique stiffness values $S_1$-$S_N$ may be based upon the spatial weight distribution profile 70 of the average-sized occupant.

In one or more arrangements, the force exerted on the seat cushion 44 by a specific occupant may produce a unique spatial weight distribution profile 70. To further enhance the comfort experienced by a specific seated occupant, it would be beneficial to tailor the pattern of the plurality of individual lattice blocks 58 having unique stiffness values $S_1$-$S_N$ to the spatial weight distribution profile 70 for the specific seated occupant. In such a way, there would be an even force distribution across the seat cushion 44 for the specific seated occupant, accomplished by a specific pattern of the plurality of individual lattice blocks 58 having unique stiffness values $S_1$-$S_N$.

In still other aspects, the present teachings provide methods of isolating a predetermined vibration of a seat cushion of a vehicle. The method may include obtaining a spatial weight distribution for an occupant on a seating surface and preparing a seating cushion having a pattern of lattice blocks, as defined above, arranged to negate, or isolate, vibration in the seat cushion. The methods may begin by obtaining a spatial weight distribution for a specific occupant in order to provide a custom seat cushion tailored for a specific occupant, or otherwise obtaining an average spatial weight distribution. An exemplary weight distribution is shown in FIGS. 3B and 5. The methods may include creating a pattern correlating the spatial weight distribution with individual lattice blocks having different stiffness values such that forces exerted by the occupant are evenly distributed. The method may also include forming a vibration isolation structure comprising a plurality of individual lattice blocks arranged according to the pattern. Each of the plurality of individual lattice blocks may have a selected stiffness value based upon a location in the pattern such that the plurality of individual lattice blocks cooperate to provide, for example, an even pressure distribution against forces exerted by the occupant. This may include, for example, forming the vibration isolation structure using individual lattice blocks comprising a bi-stable lattice. The method may further include incorporating the vibration isolation structure in a seat cushion such that the cushion exhibits a negative stiffness to isolate the predetermined vibration. This may further include aligning at least one foam support structure adjacent the vibration isolation structure.

Aspects herein can be embodied in other forms without departing from the spirit or essential attributes thereof. Accordingly, reference should be made to the following claims, rather than to the foregoing specification, as indicating the scope of the invention.

The foregoing description is provided for purposes of illustration and description and is in no way intended to limit the disclosure, its application, or uses. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A seat for a vehicle, the seat comprising a seat cushion having:
   a seating surface configured to support an occupant;
   a vibration isolation structure comprising a plurality of individual lattice blocks, the plurality of individual lattice blocks comprising a bi-stable lattice and forming a two-dimensional lamina, the vibration isolation structure defining a first surface and opposite second surface, wherein the plurality of individual lattice blocks occupy a pattern that is based on a spatial weight distribution of an average-sized occupant, and each of the plurality of individual lattice blocks has a stiffness value based upon a location in the pattern such that the plurality of individual lattice blocks cooperate to provide an even pressure distribution against forces exerted by the occupant; and
   a foam structure placed adjacent the first surface of the vibration isolation structure,
   wherein the vibration isolation structure exhibits an overall negative stiffness value configured to enhance a vibrational energy absorbance of the seat cushion in a range from about 0.5 Hz to about 5.0 Hz.

2. The seat of claim 1, wherein the seat cushion is a seat bottom and the vibration isolation structure is configured to evenly distribute forces exerted by the occupant in a generally vertical direction.

3. The seat of claim 1, wherein the seat cushion is a seat back and the vibration isolation structure is configured to evenly distribute forces exerted by the occupant in a generally horizontal direction.

4. The seat of claim 1, wherein the bi-stable lattice comprises a double concentric beam structure moveable between two stable configurations, each configuration defining a different shape.

5. The seat of claim 1, wherein the plurality of individual lattice blocks occupy a pattern that is based on a spatial weight distribution tailored for a specific occupant.

6. The seat of claim 1, wherein the plurality of the individual lattice blocks have a negative stiffness value.

7. The seat of claim 1, wherein the vibration isolation structure exhibits an overall negative stiffness value configured to enhance a vibrational energy absorbance of the seat cushion of about 2.5 Hz.

8. A seat assembly for a vehicle, the seat assembly comprising:
   a seat frame;
   a seat cushion comprising a seat bottom coupled to the seat frame, the seat cushion having:
   a seating surface configured to support an occupant;
   a vibration isolation structure comprising a plurality of individual lattice blocks, the plurality of individual lattice blocks forming a two-dimensional lamina, the plurality of individual lattice blocks occupying a pattern based on a spatial weight distribution of an average occupant such that each of the plurality of individual lattice blocks has a stiffness value based upon a location in the pattern such that the plurality of individual lattice blocks cooperate to provide a negative stiffness against forces exerted by the occupant,
   wherein the vibration isolation structure exhibits an overall negative stiffness value configured to enhance a vibrational energy absorbance of the seat cushion in a range from about 0.5 Hz to about 5.0 Hz.

9. The seat assembly of claim 8, wherein each of the plurality of individual lattice blocks comprises a double concentric beam structure moveable between two stable configurations, each configuration defining a different shape.

10. The seat assembly of claim 8, wherein the plurality of individual lattice blocks cooperate to isolate a predetermined vibration of the seat cushion.

11. A method of isolating a predetermined vibration of a custom seat cushion of a vehicle, the method comprising:
   obtaining a spatial weight distribution for a specific occupant on a seating surface;
   creating a pattern correlating the spatial weight distribution for the specific occupant with individual lattice blocks having a bi-stable lattice and having different stiffness values based upon a location in the pattern, such that forces exerted by the specific occupant are evenly distributed across the custom seat cushion;
   forming a vibration isolation structure comprising a plurality of individual lattice blocks arranged according to the pattern; and
   incorporating the vibration isolation structure in a custom seat cushion such that the custom seat cushion exhibits a negative stiffness to isolate the predetermined vibration,
   wherein the vibration isolation structure exhibits an overall negative stiffness value configured to enhance a vibrational energy absorbance of the seat cushion in a range from about 0.5 Hz to about 5.0 Hz.

12. The method of claim 11, further comprising aligning at least one foam support structure adjacent the vibration isolation structure.

* * * * *